United States Patent
Coppens

(12) 
(10) Patent No.: US 6,197,426 B1
(45) Date of Patent: Mar. 6, 2001

(54) FLUOROCHEMICAL COPOLYMER AND FLUOROCHEMICAL COPOLYMER COMPOSITIONS USEFUL FOR IMPARTING REPELLENCY PROPERTIES TO A SUBSTRATE

(75) Inventor: Dirk M. Coppens, Melsele (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/005,465

(22) Filed: Jan. 12, 1998

(51) Int. Cl.[7] .................. B32B 27/28; B32B 27/30; C08F 18/20; C08F 20/22; C08F 20/24

(52) U.S. Cl. .................. 428/421; 526/242; 526/245; 524/366; 524/462; 524/792; 524/795

(58) Field of Search .................. 428/421, 422; 526/242, 245; 524/366, 462, 792, 795

(56) References Cited

U.S. PATENT DOCUMENTS

| | | | |
|---|---|---|---|
| 4,791,166 | 12/1988 | Saukaitis | 524/544 |
| 4,791,167 | 12/1988 | Saukaitis | 524/544 |
| 5,132,028 | 7/1992 | Nagase et al. | 252/8.6 |
| 5,276,175 | 1/1994 | Dams et al. | 560/27 |
| 5,308,511 | 5/1994 | Coppens et al. | 252/8.6 |
| 5,475,070 | 12/1995 | Ashizawa et al. | 526/246 |
| 5,516,578 | 5/1996 | Coppens | 428/260 |
| 5,536,304 | 7/1996 | Coppens et al. | 252/8.57 |

FOREIGN PATENT DOCUMENTS

| | | |
|---|---|---|
| 0383310 | 8/1990 | (EP) . |
| 0756033 | 1/1997 | (EP) . |

OTHER PUBLICATIONS

H. C. Fielding, "Organofluorine Compounds and Their Applications", R. E. Banks, Ed., Society of Chemical Industry, p. 214 (1979).

Derwent Abstract AN 85–233875 and JP 60152585A (abstract) (Aug. 1985).

*Primary Examiner*—Vivian Chen
(74) *Attorney, Agent, or Firm*—Robert H. Jordan; Eloise J. Maki

(57) ABSTRACT

A method is disclosed of treating a substrate, comprising applying to the substrate a fluorochemical composition comprising fluorochemical copolymer derived from at least one fluorochemical monomer A, at least one monomer B, at least one monomer C and at least one monomer D, wherein the fluorochemical monomer A contains a fluoroaliphatic group and is an ester of an α,β-ethylenically unsaturated carboxylic acid, the monomer B is an ester of an α,β-ethylenically unsaturated carboxylic acid, the monomer C is an ethylenically unsaturated dicarboxylic acid anhydride, the monomer D is an ester of an α,β-ethylenically unsaturated carboxylic acid, the fluorochemical monomer A and the monomers B and C contain only one polymerizable group and monomer D contains, as a second polymerizable group, an ethylenically unsaturated group that has a higher affinity to copolymerize with the monomer C than fluorochemical monomer A or monomers B or D.

24 Claims, No Drawings

FLUOROCHEMICAL COPOLYMER AND FLUOROCHEMICAL COPOLYMER COMPOSITIONS USEFUL FOR IMPARTING REPELLENCY PROPERTIES TO A SUBSTRATE

FIELD OF THE INVENTION

The present invention relates to a fluorochemical copolymer and fluorochemical copolymer compositions that can be used to impart oil and/or water repellency properties to a substrate, in particular a fibrous substrate. The invention also relates to a method of preparing the fluorochemical copolymer and the use of the fluorochemical copolymers as an oil and/or water repellency treatment.

BACKGROUND OF THE INVENTION

Organofluorine, or fluorochemical compounds, are substances containing portions that are fluorocarbon in nature (e.g., hydrophobic, oleophobic, and chemically inert) and portions that are hydrocarbon in nature (e.g., chemically reactive in organic reactions). Some fluorochemicals are familiar to the general public, such as SCOTCHGARD™ carpet protector, which imparts oil and water repellency and stain and soil resistance to carpet. Other such substances have various industrial uses, such as reducing the surface tension of liquids, reducing evaporation and flammability of volatile organic liquids, and improving the leveling of organic polymer coatings.

The utility of certain organofluorine compounds as surface-active agents (i.e., surfactants) and surface-treating agents is due in large part to the extremely low free-surface energy of a $C_6$–$C_{12}$ fluorocarbon group, according to H. C. Fielding, *"Organofluorine Compounds and Their Applications,"* R. E. Banks, Ed., Society of Chemical industry at p. 214 (1979). Generally, such organofluorine substances are those which have carbon-bonded fluorine in the form of a monovalent fluoroaliphatic radical such as a perluoroalkyl group, typically $C_nF_{2n+1}$, where n is at least 3, and the terminal part of the group is trifluoromethyl, —$CF_3$.

Fluorochemical-based water and/or oil repellent compositions for treating substrates, in particular textiles and leather, are of substantial commercial importance. Amongst water and/or oil repellent compositions known in the art for the treatment of substrates are certain compositions containing fluorochemical polymers.

For example, U.S. Pat. No. 4,791,166 discloses certain copolymers soluble in odorless mineral spirits. These copolymers are prepared by polymerization of monomer mixtures comprising: perfluoroalkyl vinyl monomer; higher alkyl vinyl monomer; and a third monomer selected from the group consisting of: vinylamidoglycolate, vinyl diketoester, and vinyl ester monomer containing hydroxy and halide groups.

U.S. Pat. No. 4,791,167 discloses certain solvent-based, auto-oxidizable fluorocarbon compositions. The copolymers are prepared from the following monomers: perfluoroalkyl-containing-vinyl monomer, higher alkyl vinyl monomer and an acrylate ester containing one or more unsaturated olefinic bonds.

U.S. Pat. No. 5,132,028 discloses certain water- and oil-repellent compositions useful as fabric treatments. The compositions contain a fluorochemical water and oil repellent agent, a carbodiimide compound, and at least one of the following: plasticizer, metal alcoholate or ester, zirconium salt, alkylketene dimer, aziridine, and alkenyl succinic anhydride. The compositions may also contain a silicone water repellent.

U.S. Pat. No. 5,308,511 discloses certain solvent-based, water- and oil-repellent treating agent compositions. The compositions contain a mineral spirits solution of a fluorochemical water and oil repellent agent, zirconium carboxylic acid ester, and alkenyl succinic anhydride.

U.S. Pat. No. 5,516,578 discloses certain oil- and water-repellent compositions comprising: a fluoroaliphatic radical containing agent; and a polymer comprising cyclic carboxylic anhydride groups. Additionally the composition may also comprise a softener and/or a plasticizer. The patent discloses that the compositions provide water- and oil-repellent properties to fibrous and other substrates treated therewith and show high compatibility with commonly used softeners.

U.S. Pat. No. 5,475,070 discloses certain water- and oil-repellent agent compositions comprising, as main component, units derived from a copolymer comprising polyfluoro-oxyalkyl-containing (meth)acrylate and units derived from a dicarboxylic acid anhydride-containing (meth)acrylate.

U.S. Pat. No. 5,536,304 describes oil- and water-repellency imparting compositions that comprise: a fluoroaliphatic radical containing agent; and a cyclic carboxylic anhydride containing polysiloxane. Additionally, the composition may comprise: an extender and/or a plasticizer. The patent discloses that the compositions provide water- and oil-repellent properties and a soft hand to fibrous and other substrates treated therewith.

EP 0 756 033 discloses water- and oil-repellent compositions consisting essentially of a copolymer comprising polymeric units "A", "B", "C" and "D", and an organic solvent. Polymeric units A are derived from a polyfluoroalkyl group, and/or a polyfluoroalkyl-group-containing methacrylate; polymeric units B are derived from a hydrocarbon-group-containing acrylate, and/or a hydrocarbon-group-containing methacrylate; polymeric units C are derived from an acid anhydride having an unsaturated group; and polymeric units D are derived from triallyl cyanurate.

Fluorochemical polymers used to impart water- and/or oil-repellency to fibrous substrates are typically applied in the form of a solution using spray, aerosol or pad application or during the dry cleaning rinse cycle. Many of the solvents used to prepare such solutions are flammable, ozone depleting or dry slowly. Despite the existence of known fluorochemical compositions for these applications, there continues to be a demand for better performing fluorochemical compositions that can meet more demanding applications and be applied using a wide variety of solvents.

Accordingly, the present invention seeks to provide new fluorochemical compositions that can meet the requirements of more demanding applications and that are preferably based on a solvent that is non-ozone depleting, non-flammable and fast drying. Further, in case of application during dry cleaning, the fluorochemical composition should be compatible with the dry cleaning solvents.

SUMMARY OF THE INVENTION

The present invention provides a method for treatment of a substrate comprising applying to said substrate a fluorochemical composition comprising a fluorochemical copolymer derived from at least one fluorochemical monomer A, at least one monomer B, at least one monomer C and at least one monomer D. Fluorochemical monomer A has a fluoroaliphatic group and is an ester of an $\alpha,\beta$-ethylenically unsaturated carboxylic acid, monomer B is an ester of an $\alpha,\beta$-ethylenically unsaturated carboxylic acid, monomer C is an ethylenically unsaturated dicarboxylic acid anhydride and monomer D is an ester of an $\alpha,\beta$-ethylenically unsaturated carboxylic acid. Fluorochemical monomer A and monomers B and C contain only one polymerizable group and monomer D contains, as a further polymerizable group, an ethylenically unsaturated group that has a higher affinity to copolymerize with monomer C than with monomers A, B or D.

Further provided is a fluorochemical copolymer derived from at least one fluorochemical monomer A, at least one monomer B, at least one monomer C and at least one monomer D, said fluorochemical monomer A having a fluoroaliphatic group and being an ester of an $\alpha,\beta$-ethylenically unsaturated carboxylic acid, said monomer B being an ester of an $\alpha,\beta$-ethylenically unsaturated carboxylic acid, said monomer C being an ethylenically unsaturated dicarboxylic acid anhydride and said monomer D being an ester of an $\alpha,\beta$-ethylenically unsaturated carboxylic acid, said fluorochemical monomer A and said monomers B and C containing only one polymerizable group and said monomer D containing as a further polymerizable group an ethylenically unsaturated group that has a higher affinity to copolymerize with said monomer C than with any of said monomers A, B or D.

The present invention also provides a method of preparing the fluorochemical copolymer, a fluorochemical composition thereof and the use of the fluorochemical copolymer to provide oil and/or water repellency to a substrate.

Also provided is a substrate comprising on at least part of at least one surface thereof the fluorochemical copolymer.

DETAILED DESCRIPTION OF THE INVENTION

The fluorochemical copolymer of the present invention is derived from at least one fluorochemical monomer A, at least one monomer B, at least one monomer C and at least one monomer D. It has been found that this fluorochemical copolymer is readily soluble in fluorinated solvents such as hydrochlorofluorocarbons (HCFC's), hydrofluorocarbons (HFC's) and hydrofluoroethers or can be dispersed therein to yield a dispersion that is stable even when stored over several weeks. Also, compositions based on the fluorochemical copolymer can provide excellent oil and/or water repellency properties to a substrate, in particular to a fibrous substrate such as a fibrous substrate containing natural fibers. Moreover, the fluorochemical copolymer of the invention is readily soluble in a variety of solvents commonly used to apply oil and/or water repellents and provides good oil and/or water repellency properties when applied to substrates from these solvents. Accordingly, the fluorochemical copolymer of the invention can be applied to a substrate from various solvents using a wide variety of application methods to impart good or excellent oil and/or water repellency properties to the substrate.

The term "hydrofluorocarbon" means compounds consisting only of the elements carbon, hydrogen and fluorine.

The term "hydrochlorofluorocarbon" means compounds consisting only of the elements carbon, hydrogen, fluorine and chlorine.

The term "hydrofluoroether", in connection with the present invention, means compounds that contain at least one ether oxygen, contain carbon, hydrogen and fluorine and are free of chlorine, bromine and iodine. Hydrofluoroethers useful in this invention are typically liquid at ambient temperature and pressure (about 20° C. and 760 torr), are non-ozone depleting and can be non-flammable. Non-flammable hydrofluoroethers are preferred as solvents or dispersing media in this invention. In connection with this invention, the term "non-flammable hydrofluoroethers" means the hydrofluoroethers which do not exhibit a flash point when tested in a closed cup flash point test performed according to ASTM D 56-87.

Particularly preferred hydrofluoroethers are perfluoroalkyl alkyl ethers and more preferably, the hydrofluoroethers correspond to the following formula:

$$(R_h-O)_x-R_f \qquad (I)$$

wherein x is about 1 or 2;

$R_h$ represents an alkyl group having about 1 to 4 carbon atoms; and $R_f$ represents a fluoroaliphatic group.

$R_f$ preferably comprises between about 2 to 9 carbon atoms and, when x is 1, is preferably selected from the group consisting of a linear or branched perfluoroalkyl group, perfluorocycloalkyl group-containing perfluoroalkyl groups, perfluorocycloalkyl groups, linear or branched perfluoroalkyl groups having one or more catenary atoms, perfluorocycloalkyl-group-containing perfluoroalkyl groups having one or more catenary atoms and perfluorocycloallyl group having one or more catenary atoms and, when x is 2, is preferably selected from the group consisting of a linear or branched perfluoroalkylene groups, perfluorocycloalkyl group-containing-perfluoroalkylene groups, perfluorocycloalkylene groups, linear or branched perfluoroalkylene groups having one or more catenary atoms, perfluorocycloalkyl group-containing perfluoroalkylene groups having one or more catenary atoms and perfluorocycloalkylene groups having one or more catenary atoms.

More preferably, x is 1, and the compound is normally liquid. Most preferably, x is 1; $R_f$ is selected from the group consisting of linear or branched perfluoroalkyl groups having from 3 to about 9 carbon atoms, perfluorocycloalkyl-containing perfluoroalkyl groups having from 5 to about 7 carbon atoms, and perfluorocycloalkyl groups having from 5 to about 6 carbon atoms; $R_h$ is a methyl or ethyl group; $R_f$ can contain one or more catenary heteroatoms; and the sum of the number of carbon atoms in $R_f$ and the number of carbon atoms in $R_h$ is greater than or equal to about 4.

Representative examples of hydrofluoroethers suitable for use in the processes and composition of the invention include the following compounds: n-$C_4F_9OCH_3$, n-$C_4F_9OCH_2CH_3$, $CF_3CF(CF_3)CF_2OCH_3$, $CF_3CF(CF_3)CF_2OC_2H_5$, $C_8F_{17}OCH_3$, $CH_3O-(CF_2)_4-OCH_3$, $C_5F_{11}OC_2H_5$, $C_3F_7OCH_3$, $CF_3OC_2F_4OC_2H_5$, $C_3F_7OCF(CF_3)CF_2OCH_3$, $(CF_3)_2CFOCH_3$, $(CF_3)COCH_3$, $C_4F_9OC_2F_4OC_2F_4OC_2H_5$, $C_4F_9O(CF_2)_3OCH_3$,

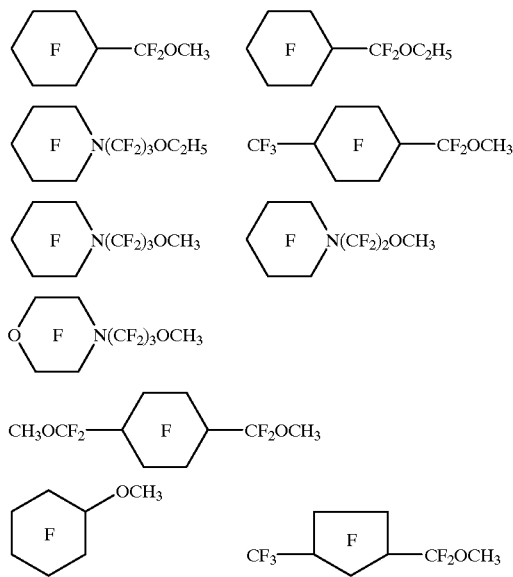

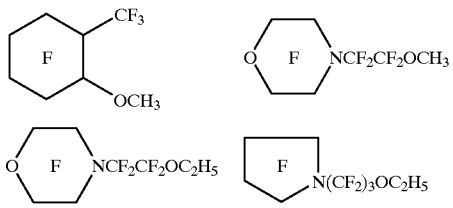

and 1,1-dimethoxyperfluorocyclohexane.

The fluorochemical monomer A is an ester of an α,β-ethylenically unsaturated carboxylic acid and contains a fluoroaliphatic group. The only polymerizable group contained in fluorochemical monomer A is the α,β-ethylenically unsaturated carboxylic group. Typically, the fluoroaliphatic group of the fluorochemical monomer A contains at least about 4 carbon atoms and more preferably at least about 6 carbon atoms. The fluoroaliphatic group can be perfluorinated or partially fluorinated. When the fluoroaliphatic group is partially fluorinated, it is preferred that at least the last 3 carbon atoms of the group are perfluorinated. Preferred fluorochemical monomers A correspond to the following formula:

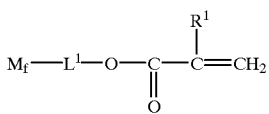
(II)

wherein $M_f$ represents a partially or fully fluorinated aliphatic group preferably having at least about 4 carbon atoms, $L^1$ represents an organic linking group or a covalent bond and $R^1$ represents hydrogen or an alkyl group having about 1 to 4 carbon atoms.

The fluoroaliphatic radical, $M_f$, in the preferred fluorochemical monomer A, is a fluorinated, stable, inert, preferably saturated, non-polar, monovalent aliphatic radical. It can be straight chain, branched chain, or cyclic or combinations thereof. It can contain heteroatoms such as oxygen, divalent or hexavalent sulfur, or nitrogen. $M_f$ is preferably a fully-fluorinated radical, but hydrogen or chlorine atoms can be present as substituents if not more than one atom of either is present for every two carbon atoms. The $M_f$ radical has at least 1 and typically up to about 18 carbon atoms, preferably about 4 to 14, and especially about 6 to 12 carbon atoms. $M_f$ preferably contains about 40% to about 78% fluorine by weight, and more preferably about 50% to about 78% fluorine by weight. The terminal portion of the $M_f$ radical is a perfluorinated moiety, which will preferably contain at least about 7 fluorine atoms, e.g., $CF_3CF_2CF_2$—, $(CF_3)_2CF$—, $F_5SCF_2$—. Especially suitable fluorochemical monomers A are those of which the $M_f$ radicals are fully or substantially fluorinated and are preferably those perfluorinated aliphatic radicals of the formula $C_nF_{2n+1}$— where n is about 3 to 18.

The linking group $L^1$ links the fluoroaliphatic group $M_f$ to the free radical polymerizable group. Linking group $L^1$ preferably contains from 1 to about 20 carbon atoms. $L^1$ can optionally contain oxygen, nitrogen, or sulfur-containing groups or a combination thereof, and $L^1$ is free of functional groups that substantially interfere with free-radical polymerization (e.g., polymerizable olefinic double bonds, thiols, and other such functionality known to those skilled in the art). Examples of suitable linking groups $L^1$ include straight chain, branched chain or cyclic alkylene, arylene, aralkylene, sulfonyl, sulfoxy, sulfonamido, carboxyamido, carbonyloxy, urethanylene, ureylene, and combinations thereof such as sulfonamidoalkylene.

Specific examples of fluorochemical monomers A include:

$CF_3CF_2(CF_2CF_2)_iCH_2CH_2O$—CO—CH=CH$_2$ $CF_3CF_2(CF_2CF_2)_iCH_2CH_2O$—CO—C(CH$_3$)=CH$_2$ wherein i is between about 1 and 6;

$CF_3(CF_2)_3CH_2$—O—CO—C(CH$_3$)=CH$_2$ $CF_3(CF_2)_3CH_2$—O—CO—CH=CH$_2$ $CF_3(CF_2)_5CH_2$—O—CO—CH=CH$_2$ $(CF_3)_2CF(CF_2)_5$—CH$_2$—CH$_2$—O—CO—C(CH$_3$)=CH$_2$ $CF_3(CF_2)_7SO_2N(CH_3)$—CH$_2$CH$_2$—O—CO—CH=CH$_2$ $CF_3(CF_2)_7SO_2N(C_2H_5)$—CH$_2$CH$_2$—O—CO—CH=CH$_2$ $CF_3(CF_2)_5SO_2N(CH_3)$—CH$_2$CH(CH$_3$)—O—CO—CH=CH$_2$ $CF_3(CF_2)_7SO_2N(CH_3)$—CH$_2$CH$_2$—O—CO—C(CH$_3$)=CH$_2$ $CF_3(CF_2)_6SO_2N(CH_3)$—CH$_2$CH$_2$—O—CO—CH=CH$_2$ $(CF_3)_2CF(CF_2)_4SO_2N(CH_3)$—CH$_2$CH$_2$—O—CO—CH=CH$_2$.

The monomer B is an ester of an α,β-ethylenically unsaturated carboxylic acid and is substantially free of fluorine. Like the fluorochemical monomer A, the only polymerizable group of monomer B is the α,β-ethylenically unsaturated carboxyl group. Monomer B is typically a hydrocarbon ester of an α,β-ethylenically unsaturated carboxylic acid. The hydrocarbon group preferably contains at least 4 carbon atoms. The hydrocarbon group may optionally contain substituents which are not reactive with the anhydride group of monomer C. Preferably, the hydrocarbon group consists of only hydrogen and carbon. The hydrocarbon group preferably contains between 4 and 36 carbon atoms and more preferably between 8 and 25 carbon atoms. The hydrocarbon group is preferably selected from the group consisting of a linear, branched or cyclic alkyl group, an aralkyl group, an alkylaryl group and an aryl group.

Preferably, monomer B corresponds to the following formula:

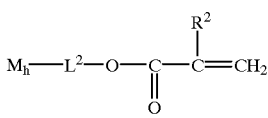
(III)

wherein $M_h$ represents a hydrocarbon group preferably having at least about 4 carbon atoms and that is preferably selected from the group consisting of a linear, branched or cyclic alkyl group, an aralkyl group, an alkylaryl group and an aryl group, $L^2$ represents an organic linking group such as for example mentioned above for $L^1$ or a covalent bond and $R^2$ represents hydrogen or an alkyl group having 1 to 4 carbon atoms.

Examples of monomers B include n-butyl(meth)acrylate, isobutyl(meth)acrylate, octadecyl(meth)acrylate, lauryl (meth)acrylate, cyclohexyl (meth)acrylate, cyclodecyl (meth)acrylate, isobornyl (meth)acrylate, phenyl (meth) acrylate, benzyl (meth)acrylate, adamatyl (meth)acrylate, tolyl (meth)acrylate, 3,3-dimethylbutyl (meth)acrylate, (2,2-dimethyl-1-methyl)propyl (meth)acrylate, cyclopentyl (meth)acrylate, 2-ethylhexyl (meth)acrylate, t-butyl (meth) acrylate, cetyl (meth)acrylate, stearyl (meth)acrylate, behenyl (meth)acrylate, isooctyl (meth)acrylate, n-octyl (meth) acrylate and 4-ethyl-cyclohexyl (meth)acrylate.

The monomer C for preparing the fluorochemical copolymer is an ethylenically unsaturated dicarboxylic acid anhydride. Preferably, monomer C corresponds to one of the following two formulas:

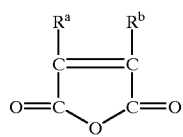

(IV)

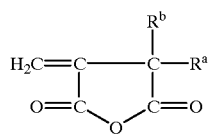

(V)

wherein $R^a$ and $R^b$ independently represent hydrogen or an alkyl group having about 1 to 4 carbon atoms. Specific examples of monomers C include itaconic anhydride, citraconic anhydride and maleic anhydride. Maleic anhydride is especially preferred.

The fluorochemical copolymer of the present invention also includes at least one unit derived from monomer D. Monomer D is an ester of an α,β-ethylenically unsaturated carboxylic acid and is a bifunctional monomer, i.e., monomer D contains two polymerizable groups. Thus in addition to the α,β-ethylenically unsaturated carboxyl group, monomer D includes a further ethylenically unsaturated group as the second polymerizable group. This second polymerizable group has a higher affinity to copolymerize with monomer C than with the α,β-ethylenically unsaturated carboxyl group of any of the monomers A, B or D. If the second polymerizable group has too much affinity to copolymerize with an α,β-ethylenically unsaturated carboxyl group, gellation and crosslinking of the fluorochemical copolymer may occur. Furthermore, since monomer C does not readily copolymerize with an α,β-ethylenically unsaturated carboxyl group, copolymerization of monomer C with the second polymerizable group of monomer D assures that monomer C is included into the fluorochemical copolymer. The inclusion of monomer C was found to be essential for the solubility and performance of the fluorochemical copolymer. Accordingly, the second polymerizable group of monomer D is preferably a group that readily copolymerizes with monomer C but does not readily copolymerize with an α,β-ethylenically unsaturated carboxyl group. Typically, the second polymerizable group is an alkenyl group and preferably an allyl group.

Specific examples of monomers D include allyl(meth) acrylate, oleyl(meth)acrylate, dicyclopentenyloxyethyl (meth)acrylate and dicyclopentenyl (meth)acrylate.

While the fluorochemical copolymer of the invention should at least include one monomer of each of the monomers A, B, C and D, it will be understood that two or more different monomers of each of the monomers A, B, C and D can be used to prepare the fluorochemical copolymer. Also, the fluorochemical copolymer may include further units derived from other monomers than monomers A, B, C and D. Examples of the latter include vinyl chloride, styrene, acrylamides, methacrylamides, allyl acetate, vinyl acetate and maleimide.

The preferred fluorochemical copolymer of the invention generally contains between about 40 and 90% by weight of units derived from said fluorochemical monomers A, between about 5 and 60% by weight of units derived from said monomers B, between about 0.1 and 20% by weight of units derived from said monomers C and between about 0.1 and 20% by weight of units derived from said monomers D.

The fluorochemical copolymer of the present invention is typically prepared by free radical polymerization of at least one of each of monomers A, B, C and D. Although any well known method of polymerization can be used, it is preferred to prepare the fluorochemical polymer by solution polymerization. Suitable solvents include any inert and dry organic solvent such as ketones, acetates and ethers. A particularly preferred solvent for the polymerization of the fluorochemical copolymer is the hydrofluoroether mentioned above. The free radical polymerization may be initiated thermally or photochemically with or without the use of an initiator. Suitable initiators include organic peroxides, azo compounds or persulfates. The polymerization may further be carried out in the presence of a chain transfer agent or a chain terminator to tailor the molecular weight and/or properties of the fluorochemical copolymer. Typically, the fluorochemical copolymer of the present invention has a weight average molecular weight between 5000 and 1,000,000.

The fluorochemical copolymer of the invention can be used to impart oil and/or water repellency properties to a substrate. Typically, the fluorochemical copolymer is dissolved or dispersed in an organic solvent to form a fluorochemical composition. Suitable organic solvents for dissolution or dispersion include hydrocarbon solvents such as esters, ketones or acetates; fluorinated solvents, such as HCFCs, HFCs and hydrofluoroethers. Specific examples of HCFCs include Klin® AK-225 (isomer mixture of $C_3Cl_2HF_5$, available from Asahi Glass Inc.), Forane® 141b DGX ($CCl_2F$—$CH_3$, available from Elf Atochem) and examples of HFCs include Vertrel® XF ($CF_3$—CHF—CHF—$CF_2CF_3$, available from E.I. Dupont de Nemours and Company). A particularly preferred solvent is the aforementioned hydrofluoroether. It is furthermore possible to use a mixture of solvents such as for example a mixture of one or more hydrocarbon solvents or a mixture of a hydrocarbon solvent and a hydrofluoroether. Most preferably, the solvent consists essentially of hydrofluoroether. The fluorochemical composition of the present invention preferably contains between about 0.1% and 65% by weight of the fluorochemical copolymer and more preferably between about 0.2% and 40% by weight.

The fluorochemical composition may contain further additives usually employed in oil and water repellency imparting compositions, such as softeners, e.g., silicone softening agents, and/or plasticizers. The softening agent will increase the soft feeling of the treated substrate. Suitable silicone softening agents include those selected from the group consisting of polydimethylsiloxanes, and polyhydroxymethylsiloxanes. If used, the softening agent is typically present in an amount between about 5% and 300% by weight, preferably between about 15% and 200% by weight, based on the fluorochemical copolymer contained in the composition.

Suitable plasticizers include aliphatic or aromatic esters, such as dioctyladipate, dioctylazelate, ditridedecyladipate, di(2-ethylhexyl)azelate, di(2-ethylhexyl)maleate, diethylhexylsebacate, diisodecylphtalate, ditridecylphtalate, and diisononylphtalate; polyester type plasticizers such as Priplast™ plasticizers (available from Unichema Chemie GmbH, Emmerich, GERMANY); paraffins and substituted paraffins, such as Chlorparaffins (available from Hüls AG, Marl, GERMANY); epoxytype plasticizers, such as Rheoplast™ plasticizers (available from Ciba-Geigy AG, Basel, SWITZERLAND). If used, the plasticizer is generally present in an amount of between about 10 and 200%, preferably between about 20 and 100% by weight of the fluorochemical copolymer.

The fluorochemical composition can be applied to a substrate by any technique commonly used to apply a coating to a substrate. For example, the fluorochemical composition can be applied by dip coating followed by drying. The substrate may be dried at room temperature or at elevated temperature. Typically, the drying may be carried out at a temperature of 20° C. to about 80° C., optionally followed by heat curing at 120° C. The fluorochemical composition may also be filled in a container under pressure to form an aerosol formulation. The fluorochemical composition can then be applied by spraying the substrate. Still further, the fluorochemical composition can be applied to a substrate during the dry cleaning procedure in a dry cleaning machine in case the substrate is a fabric or textile. Further application methods include, pad application, roll coating and brush application.

The amount of the fluorochemical composition applied to a substrate in accordance with this invention is chosen so that sufficiently high or desirable water and oil repellencies are imparted to the substrate surface, said amount usually being such that about 0.01% to 5% by weight, preferably about 0.05% to 2% by weight, based on the weight of the substrate, of fluorochemical composition is present on the treated substrate. The amount which is sufficient to impart desired repellency can be determined empirically and can be increased as necessary or desired.

The substrates treated by the fluorochemical composition of this invention are not especially limited and include fibrous materials such as textile fabrics, fibers, non-wovens, leather, paper, carpet or plastic, wood, metal, glass, stone.

EXAMPLES

The following examples illustrate the invention without the intention to limit the invention thereto. In the examples all parts, ratios, percentages are by weight unless otherwise noted.

Formulation and Treatment Procedure

Treatment baths were formulated containing a defined amount of the fluorochemical treatment agent. Treatments were applied to the test substrates by padding to provide a concentration between 0.08 and 0.3% (depending on the substrate tested and based on fabric weight). The concentration is indicated as SOF (solids on fabric). The samples were dried at room temperature. Substrates used for the evaluation of treatments of this invention were commercially available and are listed below:

Polyester microfiber: Style No 6145, available from Sofinal, Belgium
PES/CO: polyester/cotton 65/35 blends, available from Arlitex, Avelgem, Belgium
Polyamide microfiber: Style No 7819, available from Sofinal, Belgium
JIS cotton: cotton according to Japan Industrial Standard The treated substrates were tested for their oil and water repellency after drying at room temperature and after ironing at 120° C. during 20 seconds.

Respective data of oil and water repellency shown in the Examples and Comparative Examples are based on the following methods of measurement and evaluation criteria:

Oil Repellency (OR)

The oil repellency of a substrate was measured by the American Association of Textile Chemists and Colorists (AATCC) Standard Test Method No. 11 8-1983, which test was based on the resistance of a treated substrate to penetration by oils of varying surface tensions. Treated substrates resistant only to Nujol® mineral oil (the least penetrating of the test oils) were given a rating of 1, whereas treated substrates resistant to heptane (the most penetrating of the test liquids) were given a rating of 8. Other intermediate values were determined by use of other pure oils or mixtures of oils, as shown in the following table.

| Standard Test Liquids | |
|---|---|
| AATCC Oil Repellency Rating Number | Compositions |
| 1 | Nujol ® |
| 2 | Nujol ®/n-Hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Spray Rating (SR)

The spray rating of a treated substrate is a value indicative of the dynamic repellency of the treated substrate to water that impinges on the treated substrate. The repellency was measured by Standard Test Number 22, published in the 1985 Technical Manual and Yearbook of the American Association of Textile Chemists and Colorists (AATCC), and is expressed in terms of 'spray rating' of the tested substrate. The spray rating was obtained by spraying 250 ml water on the substrate from a distance of 15 cm. The wetting pattern was visually rated: using a 0 to 100 scale, where 0 means complete wetting and 100 means no wetting at all.

Abbreviations

The following abbreviations and trade names were used in the Examples and Comparative Examples:

AIBN: 2,2'-azo(bis)isobutyronitrile
MeFOSEMA: N-methyl perfluorooctyl sulfonamido ethyl methacrylate
Fluowet™ $AC_{812}$: telomer type fluorochemical acrylate $C_nF_{2n+1}$—$CH_2CH_2OC(O)CH=CH_2$, available from Hoechst
ODMA: octadecyl methacrylate
ODA: octadecyl acrylate
AMA: allyl methacrylate
MA: maleic anhydride
AAEMA: 2-hydroxyethyl methacrylate ester of acetoacetic acid, available from Lonza
DCPOEMA: dicyclopentenyl oxy ethyl methacrylate, available from Wako
DCPOEA: dicyclopentenyl oxy ethyl acrylate, available from Wako
$VCL_2$: vinylidene chloride
CHPMA: (3-Chloro, 2-hydroxy)-propyl methacrylate
TAC: triallyl cyanurate
4-META: 4-methacryloxy ethyl trimellitate anhydride
nBUAC: n-butyl acetate
LMA: lauryl methacrylate
IBMA: isobutyl methacrylate
ex: example
nOSH: n-octylmercaptane
RT: room temperature.

General Procedure for the Synthesis of the Fluorochemical Copolymers

Several fluorochemical copolymers were made according to the general procedure as outlined for the synthesis of MeFOSEMA/ODMA/AMA/MA 77.7/19.4/1.9/1.0.

A 250 ml glass bottle was charged with 24 g MeFOSEMA, 6 g ODMA, 0.6 g AMA, and 0.3 g MA. 70 g perfluorobutyl methyl ether as reaction solvent were added as well as 0.3 g n-octylmercaptane. After 1.2 g lauroylperoxide initiator were added, the bottle was deaerated and purged with nitrogen. The bottle was sealed and the reaction was done in a Launder-O-meter (AATCC Standard Instrument available from Atlas) at a temperature of 70° C., during 16 hours. After polymerization, the reaction mixture was cooled to room temperature and diluted with perfluorobutyl methyl ether to a concentration of 0.2% solids. This solution was then used to treat textile by solvent pad application as outlined above.

Examples 1 to 6 and Comparative Examples C-1 to C-3

In Examples 1 to 6 fluorochemical copolymers comprising MeFOSEMA/ODMA/AMA/MA as given in Table 1 were prepared according to the general procedure outlined above. Comparative Examples C-1 to C-3 were made without the use of AMA and/or MA. The composition of the Examples and Comparative Examples and the appearance of the polymer mixture are given in Table 1.

TABLE 1

Composition of Fluorochemical Copolymers (in % by weight)

| Ex | MeFOSEMA | ODMA | AMA | MA | Appearance of Polymer Solution |
|----|----------|------|-----|-----|-------------------------------|
| 1  | 24 | 6 | 0.6 | 0.3 | stable emulsion |
| 2  | 24 | 6 | 0.6 | 0.6 | hazy yellow solution |
| 3  | 24 | 6 | 0.6 | 0.9 | clear solution |
| 4  | 24 | 6 | 1.2 | 0.3 | clear solution |
| 5  | 24 | 6 | 1.2 | 0.6 | clear solution |
| 6  | 24 | 6 | 1.2 | 1.2 | clear solution |
| C-1| 24 | 6 | —   | —   | stable emulsion |
| C-2| 24 | 6 | 1.2 | —   | hazy solution |
| C-3| 24 | 6 | —   | 0.9 | hazy solution with sediment |

The fluorochemical copolymers of the Examples and Comparative Examples were diluted with perfluorobutyl methyl ether and applied to PES/CO 65/35 at 0.22% SOF; to polyester microfiber at 0.08% SOF and to polyamide microfiber at 0.18% SOF. After drying and ironing the treated substrates were tested for their oil and water repellency. The results are given in Table 2.

As can be seen from the results, improved performance is observed of the substrates treated with the fluorochemical copolymers according to the invention. On PES/CO, an improvement in both spray rating and oil repellency was observed, both on the dried and ironed sample. On polyamide microfiber, an improvement in oil repellency was observed, especially when the substrate was ironed. The polyester microfiber had improved spray rating on the sample dried at room temperature. Comparative example C-3 showed relative good performance, but it is a drawback that this sample contained a lot of sediment after polymerization, which makes the polymer not suitable for use in perfluorobutyl methyl ether as solvent.

Examples 7 to 11 and Comparative Examples C-4 to C-8

Examples 7 to 11 were made according to the general procedure and with monomer compositions as given in Table 3. Comparative examples $C_4$ to C-8 were made of MeFOSEMA/ODMA with several monomers, but without the use of a monomer of type C and/or monomer of type D. Comparative examples C-4 to C-8 were made essentially according to the procedures as described in U.S. Pat. No. 4,791,166 (C-4 and C-5); U.S. Pat. No. 5,475,070 (C-6); EP 0756 033 (C-7) and U.S. Pat. No. 4,791,167 (C-8). The composition of the Examples and Comparative Examples are given in Table 3.

TABLE 3

Composition of Fluorochemical Copolymers Prepared in Perfluorobutyl Methyl Ether (% by weight)

| Ex | MeFOSEMA | ODMA | AMA | MA | Other Comonomers |
|----|----------|------|-----|-----|------------------|
| 7  | 24 | 6   | 0.9 | 0.9 | —         |
| 8  | 24 | —   | 0.9 | 0.9 | 6 LMA     |
| 9  | 24 | —   | 0.9 | 0.9 | 6 IBMA    |
| 10 | 24 | 4.5 | 0.6 | 0.6 | 1.5 AAEMA |
| 11 | 24 | 4.5 | 0.6 | 0.6 | 1.5 $VCl_2$ |
| C-4| 24 | 3   | —   | —   | 3 AAEMA   |
| C-5| 24 | 3   | —   | —   | 3 CHPMA   |
| C-6| 24 | 6   | —   | —   | 0.6 4-META |
| C-7| 24 | 6   | —   | 0.3 | 0.9 TAC   |
| C-8| 24 | 6   | —   | —   | 1.2 DCPOEMA |

After polymerization, the reaction mixtures of Examples 7 to 10 were clear to slightly hazy yellowish viscous solutions and could be diluted with perfluorobutyl methyl

TABLE 2

Oil and Water Repellency of Substrates Treated with Fluorochemical Copolymers

| | PES/CO 65/35 | | | | Polyamide microfiber | | | | Polyester microfiber | | | |
|---|---|---|---|---|---|---|---|---|---|---|---|---|
| | RT | | Ironed | | RT | | Ironed | | RT | | Ironed | |
| Ex No | OR | SR | OR | SR | OR | SR | OR | SR | OR | SR | OR | SR |
| 1  | 2 | 80 | 4 | 100 | 2 | 100 | 3 | 100 | 0 | 100 | 1 | 100 |
| 2  | 2 | 80 | 5 | 100 | 3 | 100 | 5 | 100 | 0 | 100 | 1 | 100 |
| 3  | 2 | 90 | 5 | 100 | 3 | 100 | 5 | 100 | 0 | 100 | 1 | 100 |
| 4  | 2 | 80 | 5 | 100 | 3 | 100 | 5 | 100 | 0 | 100 | 1 | 100 |
| 5  | 2 | 80 | 5 | 100 | 3 | 100 | 5 | 100 | 0 | 100 | 1 | 100 |
| 6  | 2 | 90 | 5 | 100 | 2 | 100 | 4 | 100 | 0 | 100 | 1 | 100 |
| C-1| 2 | 50 | 3 | 70  | 2 | 100 | 2 | 100 | 0 | 80  | 1 | 100 |
| C-2| 3 | 50 | 3 | 80  | 2 | 100 | 2 | 100 | 0 | 80  | 1 | 100 |
| C-3| 2 | 80 | 4 | 100 | 2 | 100 | 4 | 100 | 1 | 90  | 1 | 100 | ether without any problems. Example 11 was a clear brown solution. Comparative Example C-7 was a hazy solution with some sediment and Comparative Example C-6 was a dispersion containing a lot of insoluble sediment and could not be used to treat substrates. All Examples and Comparative Examples (except for C-6) were used to treat substrates as mentioned above. The results of oil and water repellency of the treated substrates are given in Table 4.

tional solvent such as n-butylacetate. In Comparative Example C-9, a copolymer of MeFOSEMA/ODMA was made without the addition of AMA and MA. The polymers were made using essentially the same procedure as outlined above, except that AIBN was used as initiator. In both cases clear yellow solutions were obtained. The composition of the polymers is given in Table 6.

TABLE 4

Oil and Water Repellency of Substrates Treated with Fluorochemical Polymers

| | PES/CO 65/35 | | | | Polyamide Microfiber | | | | Polyester Microfiber | | | |
|---|---|---|---|---|---|---|---|---|---|---|---|---|
| Ex | RT | | Ironed | | RT | | Ironed | | RT | | Ironed | |
| No | OR | SR | OR | SR | OR | SR | OR | SR | OR | SR | OR | SR |
| 7 | 2 | 90 | 5 | 100 | 2 | 100 | 4 | 100 | 1 | 100 | 2 | 100 |
| 8 | 2 | 80 | 4 | 100 | 2 | 100 | 4 | 100 | 0 | 100 | 1 | 100 |
| 9 | 1 | 80 | 3 | 100 | 2 | 80 | 3 | 90 | 0 | 100 | 1 | 100 |
| 10 | 2 | 80 | 3 | 100 | 2 | 90 | 4 | 100 | 1 | 90 | 1 | 90 |
| 11 | 2 | 90 | 4 | 100 | 2 | 100 | 3 | 100 | 1 | 100 | 1 | 100 |
| C-4 | 2 | 90 | 4 | 100 | 2 | 80 | 3 | 80 | 1 | 80 | 1 | 80 |
| C-5 | 2 | 50 | 4 | 80 | 3 | 90 | 3 | 100 | 1 | 80 | 1 | 80 |
| C-7 | 1 | 70 | 4 | 90 | 2 | 90 | 3 | 100 | 1 | 80 | 1 | 100 |
| C-8 | 2 | 50 | 4 | 70 | 3 | 90 | 3 | 100 | 1 | 100 | 1 | 100 |

The polymers according to the invention show better stability and solubility in non flammable hydrofluoroethers such as perfluorobutyl methyl ether as compared to solution polymers known in the art. Furthermore, they also provide superior oil and water repellent properties to substrates treated therewith.

Examples 12 and 13

In Examples 12 and 13, solution polymers were made of MeFOSEMA/ODMA/MA (24/6/0.6) with an alternative unsaturated comonomer such as DCPOEA (2.3) in Example 12 and DCPOEMA (2.4) in Example 13. The polymers were made and applied to substrates in the general way as described above. The results of oil and water repellency are given in Table 5.

TABLE 5

Oil and Water Repellency

| | PES/CO 65/35 | | | | Polyamide Microfiber | | | | Polyester Microfiber | | | |
|---|---|---|---|---|---|---|---|---|---|---|---|---|
| Ex | RT | | Ironed | | RT | | Ironed | | RT | | Ironed | |
| No | OR | SR | OR | SR | OR | SR | OR | SR | OR | SR | OR | SR |
| 12 | 3 | 80 | 5 | 100 | 2 | 90 | 4 | 100 | 0 | 90 | 0 | 100 |
| 13 | 3 | 80 | 5 | 100 | 3 | 90 | 5 | 100 | 0 | 80 | 0 | 100 |

As can be seen from the results, fluorochemical copolymers providing a good level of performance to substrates were made.

Example 14 and Comparative Example C-9

In Example 14, a fluorochemical copolymer of MeFOSEMA/ODMA/AMA/MA was made in a conven-

TABLE 6

Composition of Fluorochemical Copolymers Prepared in n-Butyl Acetate

| Ex | MeFOSEMA | ODMA | AMA | MA | AIBN | nOSH | nBUAC |
|---|---|---|---|---|---|---|---|
| 14 | 14.6 | 7.9 | 1.0 | 0.5 | 0.25 | 0.15 | 52.5 |
| C-9 | 14.6 | 7.9 | — | — | 0.25 | 0.15 | 52.5 |

The polymers of Example 12 and Comparative Example C-9 were diluted with nBUAC to a polymer concentration of 0.375%. The so formed solutions were used to treat textile fabric by solvent pad application, so as to give a concentration of 0.3% SOF for PES/CO 65/35, 0.18% SOF on polyester microfiber and 0.28% SOF on polyamide microfiber. The treated fabrics were tested after drying at room temperature and after ironing at 120° C. during 15 sec. The results of oil and water repellency are given in Table 7.

TABLE 7

Oil and Water Repellency Properties of Fabrics Treated with Fluorochemical Polymers in nBUAC

| Ex | PES/CO 65/35 | | | | Polyamide Microfiber | | | | Polyester Microfiber | | | |
|----|----|----|----|----|----|----|----|----|----|----|----|----|
| | RT | | Ironed | | RT | | Ironed | | RT | | Ironed | |
| No | OR | SR | OR | SR | OR | SR | OR | SR | OR | SR | OR | SR |
| 14  | 4 | 90 | 3 | 90 | 4 | 100 | 4 | 100 | 0 | 100 | 0 | 100 |
| C-9 | 3 | 70 | 5 | 70 | 3 | 90  | 2 | 100 | 0 | 80  | 0 | 90  |

The results showed that the copolymer of the present invention had high performance also when used in conventional solvents.

Examples 15–17

In Examples 15 and 16, fluorochemical copolymers were made of MeFOSEMA/ODMA/AMA/MA 77.7/19.4/1.9/1.0 using the general procedure as outlined above. Example 15 was made in FORANE 141b DGX, (HCFC, available from Elf Atochem); Example 16 was made in ASAHI KLIN AK-225 (HCFC, available from Asahi Glass Co) and Example 17 was made with Vertrel® XF (HFC available from Dupont). After the polymerization, clear greenish solutions were obtained for Examples 15 and 16 and a milky white emulsion for Example 17. When applied to textile substrates, according to the method described above, good oil and water repellent properties were obtained.

TABLE 8

Oil and Water Repellent Properties of Fabrics Treated with Fluorochemical Polymers in Fluorinated Solvents

| Ex | PES/CO 65/35 | | | | Polyamide Microfiber | | | |
|----|----|----|----|----|----|----|----|----|
| | RT | | Ironed | | RT | | Ironed | |
| No | OR | SR | OR | SR | OR | SR | OR | SR |
| 15 | 2 | 80+ | 4 | 100 | 4 | 90+ | 5 | 100 |
| 16 | 1 | 80  | 2 | 100 | 2 | 70  | 2 | 80+ |
| 17 | 3 | 80+ | 5 | 100 | 3 | 100 | 5 | 100 |

Example 18

In Example 18, a mixture of Fluowet™ AC 812/ODA/AMA/MA 80/15/2/3 was polymerised in perfluorobutyl ethyl ether, using 0.5% AIBN. The reaction was run at 80° C. during 20 hours. A slightly hazy yellow, high viscous solution was obtained. The solution was diluted with $C_4F_9OC_2H_5$ and applied to JIS cotton by pad application at 0.3% SOF. After drying at room temperature, the treated cotton sample had a water repellency (WR) of 100 and an oil repellency (OR) of 5.

I claim:

1. A method of treating a substrate comprising applying to the substrate a fluorochemical composition comprising fluorochemical copolymer derived from at least one fluorochemical monomer A, at least one monomer B, at least one monomer C and at least one monomer D wherein:

(a) the fluorochemical monomer A contains a fluoroaliphatic group and is an ester of an α, β-ethylenically unsaturated carboxylic acid,
    (b) the monomer B is an ester of an α,β-ethylenically unsaturated carboxylic acid,
    (c) the monomer C is an ethylenically unsaturated dicarboxylic acid anhydride,
    (d) the monomer D is an ester of an α,β-ethylenically unsaturated carboxylic acid,
    (e) the fluorochemical monomer A and the monomers B and C contain only one polymerizable group and monomer D contains, as a second polymerizable group, an ethylenically unsaturated group that has a higher affinity to copolymerize with the monomer C than fluorochemical monomer A or monomers B or D.

2. A method according to claim 1, wherein the method imparts oil and/or water repellency to the substrate.

3. A method according to claim 1, wherein the fluorochemical copolymer is dissolved or emulsified in fluorinated solvent selected from the group consisting of hydrofluorocarbons, hydrochlorofluoro carbons and hydrofluoro ethers.

4. A method according to claim 3, wherein the hydrofluoroether is selected from the group consisting of perfluoroalkyl alkyl ethers.

5. A method according to claim 3, wherein the hydrofluoroether is represented by the following formula:

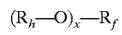

wherein:

x is an integer of 1 or 2;

$R_h$ represents an alkyl group having about 1 to 4 carbon atoms; and $R_f$ represents a fluoroaliphatic group.

6. A method according to claim 1, wherein the fluorochemical copolymer contains between about 40 to 90% by weight of units derived from fluorochemical monomer A, between about 5 to 60% by weight of units derived from monomer B, between about 0.1 to 20% by weight of units derived from monomer C, and between about 0.1 to 20% by weight of units derived from monomer D.

7. A method according to claim 1, wherein at least one of the fluorochemical monomers A is represented by the following formula:

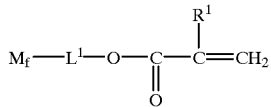

wherein:

$M_f$ represents a partially or fully fluorinated aliphatic group having at least about 4 carbon atoms, $L^1$ represents an organic linking group or a covalent bond, and $R^1$ represents hydrogen or an alkyl group having about 1 to 4 carbon atoms.

8. A method according to claim 1, wherein at least one of the monomers B is represented by the following formula:

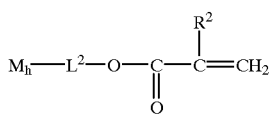

wherein:
- $M_h$ represents a hydrocarbon group selected from the group consisting of a linear, branched or cyclic alkyl groups, aralkyl groups, alkylaryl groups and aryl groups,
- $L^2$ represents an organic lining group or a covalent bond, and
- $R^2$ represents hydrogen or an alkyl group having about 1 to 4 carbon atoms.

9. A method according to claim 1, wherein at least one of the monomers C is selected from the group of compounds represented by the following formulas:

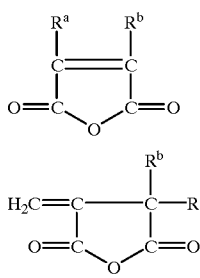

wherein $R^1$ and $R^b$ independently represent hydrogen or an alkyl group having about 1 to 4 carbon atoms.

10. A method according to claim 9, wherein at least one monomer C is maleic anhydride.

11. A method according to claim 1, wherein at least one of the monomers D is selected from the group consisting of alkenyl acrylates or alkenyl methacrylates.

12. A fluorochemical copolymer derived from at least one fluorochemical monomer A, at least one monomer B, at least one monomer C and at least one monomer D, wherein:
  (a) the fluorochemical monomer A has a fluoroaliphatic group and is an ester of an α,β-ethylenically unsaturated carboxylic acid,
  (b) the monomer B is an ester of an α,β-ethylenically unsaturated carboxylic acid,
  (c) the monomer C is an ethylenically unsaturated dicarboxylic acid anhydride,
  (d) the monomer D is an ester of an α,β-ethylenically unsaturated carboxylic acid, and
  (e) the fluorochemical monomer A and the monomers B and C contain only one polymerizable group, and the monomer D contains, as a second polymerizable group, an ethylenically unsaturated group that has a higher affinity to copolymerize with monomer C than fluorochemical monomer A or monomers B or D.

13. A fluorochemical copolymer according to claim 12, wherein the fluorochemical copolymer contains between about 40 to 90% by weight of units derived from fluorochemical monomer A, between about 5 to 60% by weight of units derived from monomer B, between about 0.1 to 20% by weight of units derived from monomer C, and between about 0.1 to 20% by weight of units derived from monomer D.

14. A fluorochemical copolymer according to claim 12, wherein at least one of the fluorochemical monomers A is represented by the following formula:

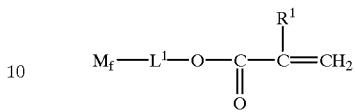

wherein:
- $M_f$ represents a partially or fully fluorinated aliphatic group having at least about 4 carbon atoms,
- $L^1$ represents an organic linking group or a covalent bond, and
- $R^1$ represents hydrogen or an alkyl group having about 1 to 4 carbon atoms.

15. A fluorochemical copolymer according to claim 12, wherein at least one of the monomers B is represented by the following formula:

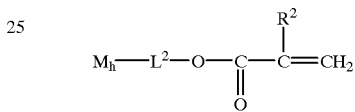

wherein:
- $M_h$ represents a hydrocarbon group selected from the group consisting of a linear, branched or cyclic alkyl groups, aralkyl groups, alkylaryl groups and aryl groups,
- $L^2$ represents an organic linking group or a covalent bond, and
- $R^2$ represents hydrogen or an alkyl group having about 1 to 4 carbon atoms.

16. A fluorochemical copolymer according to claim 12, wherein at least one of the monomers C is selected from the group of compounds represented by the following formulas:

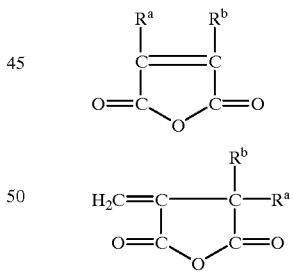

wherein $R^a$ and $R^b$ independently represent hydrogen or an alkyl group having about 1 to 4 carbon atoms.

17. A fluorochemical copolymer according to claim 16, wherein at least one of the monomers C is maleic anhydride.

18. A fluorochemical copolymer according to claim 12, wherein at least one of the monomers D is selected from the group consisting of alkenyl acrylates or alkenyl methacrylates.

19. A fluorochemical composition comprising the fluorochemical copolymer of claim 12 dissolved or dispersed in a fluorinated solvent selected from the group consisting of hydrofluorocarbons, hydrochlorofluorocarbons and hydrofluoroethers.

20. A substrate comprising on at least part of at least one surface thereof the fluorochemical copolymer of claim 12.

21. A method for making a fluorochemical copolymer comprising the free radical polymerization of at least one fluorochemical monomer A, at least one monomer B, at least one monomer C and at least one monomer D, wherein the fluorochemical monomer A has a fluoroaliphatic group and is an ester of an α,β-ethylenically unsaturated carboxylic acid, the monomer B is an ester of an α,β-ethylenically unsaturated carboxylic acid, the monomer C is an ethylenically unsaturated dicarboxylic acid anhydride and the monomer D is an ester of an α,β-ethylenically unsaturated carboxylic acid, the fluorochemical monomer A and the monomers B and C contain only one polymerizable group and the monomer D contains, as a second polymerizable group, an ethylenically unsaturated group that has a higher affinity to copolymerize with the monomer C than with fluorochemical monomer A or monomers B or D.

22. A method according to claim 21 wherein the polymerization is carried out in a fluorinated solvent selected from the group consisting of hydrofluorocarbons, hydrochlorofluorocarbons and hydrofluoroethers.

23. A method according to claim 22 wherein the hydrofluoroether is a perfluoroalkyl alkyl ether.

24. A method according to claim 22 wherein the hydrofluoroether is represented by the following formula:

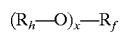

wherein:

x is an integer of 1 or 2;

$R_h$ represents an alkyl group having about 1 to 4 carbon atoms; and $R_f$ represents a fluoroaliphatic group.

* * * * *

UNITED STATES PATENT AND TRADEMARK OFFICE
CERTIFICATE OF CORRECTION

PATENT NO.    : 6,197,426 B1
DATED         : March 6, 2001
INVENTOR(S)   : Dirk M. Coppens It is certified that error appears in the above-identified patent and that said Letters Patent is hereby corrected as shown below:

<u>Title page,</u>
Item [56], under References Cited, the following should be added:
--                          U.S. PATENT DOCUMENTS

| | | |
|---|---|---|
| Re 32,199  | 7-8-86    | Carlson |
| 2,666,797  | 1-19-54   | Husted et al. |
| 2,732,398  | 1-24-56   | Brice et al. |
| 2,803,615  | 8-20-57   | Ahlbrecht et al. |
| 2,803,656  | 8-20-57   | Ahlbrecht et al. |
| 3,346,612  | 10-10-67  | Robert L. Hansen |
| 3,420,877  | 1-7-69    | Frank J. Pavlik |
| 3,528,954  | 9-15-70   | Carlson |
| 3,616,371  | 10-26-71  | Ukihashi et al. |
| 3,635,926  | 1-18-72   | Gresham et al. |
| 3,900,372  | 8-19-75   | Childs et al. |
| 4,024,178  | 5-17-77   | Landucci |
| 4,029,868  | 6-14-77   | Carlson |
| 4,043,965  | 8-23-77   | Dickson |
| 4,046,944  | 9-6-77    | Mueller et al. |
| 4,123,602  | 10-31-78  | Ukihashi et al. |
| 4,158,678  | 6-19-79   | Tatemoto et al. |
| 4,243,770  | 1-6-81    | Tatemoto et al. |
| 4,499,249  | 2-12-85   | Nakagawa et al. |
| 4,558,141  | 12-10-85  | Squire |
| 4,714,756  | 12-22-87  | Buckmaster |
| 4,791,166  | 12-13-88  | Saukaitis |
| 4,791,167  | 12-13-88  | Saukaitis |
| 4,946,936  | 8-7-90    | Moggi et al. |
| 4,948,844  | 8-14-90   | Nakahara et al. |
| 5,132,028  | 7-21-92   | Nagase et al. |
| 5,182,342  | 1-26-93   | Feiring et al. |
| 5,276,175  | 1-4-94    | Dams et al. |
| 5,285,002  | 2-8-94    | Grootaert |
| 5,308,511  | 5-3-94    | Coppens et al. |
| 5,378,782  | 1-3-95    | Grootaert |
| 5,475,070  | 12-12-95  | Ashizawa et al. |
| 5,516,578  | 5-14-96   | Coppens |
| 5,532,310  | 7-2-96    | Grenfell et al. |
| 5,536,304  | 7-16-96   | Coppens et al. |
| 5,639,837  | 6-17-97   | Farnham |

UNITED STATES PATENT AND TRADEMARK OFFICE
CERTIFICATE OF CORRECTION

PATENT NO.    : 6,197,426 B1
DATED         : March 6, 2001
INVENTOR(S)   : Dirk M. Coppens It is certified that error appears in the above-identified patent and that said Letters Patent is hereby corrected as shown below:

FOREIGN PATENT DOCUMENTS

| | | |
|---|---|---|
| WO 93/24586 | 09.12.93 | PCT |
| WO 94/07937 | 14.04.94 | PCT |
| WO 97/02300 | 23.01.97 | PCT |
| WO 97/28229 | 07.08.97 | PCT |
| WO 99/15920 | 01.04.99 | PCT |
| WO 99/16809 | 08.04.99 | PCT |
| WO 99/32439 | 01.07.99 | PCT |
| WO 99/35176 | 15.07.99 | PCT |
| 077 998 | 04.05.83 | EP |
| 336 607 | 11.10.89 | EP |
| 383 310 | 22.08.90 | EP |
| 526 976 | 10.02.93 | EP |
| 648 887 | 19.04.95 | EP |
| 656 440 | 07.06.95 | EP |
| 756 033 | 29.01.97 | EP |
| 1151293 | | JP |
| 63-235334 | 09.30.88 | JP |
| 3-17106 | 01.25.91 | JP |
| 2 287 432 | 05.07.76 | FR |
| 2274462 | | GB |
| 1 294 949 | 14.05.69 | DE |

OTHER DOCUMENTS
Annual Book of ASTM Standards, Section 5: Petroleum Products, Lubricants, and Fossil Fuels, D 56-97a, 1998, pgs. 1-5 (This is a more current version of test procedure D56-87)
AATCC Technical Manual, Vol. 67, 1992, pgs. 194-195 (Test method 118-1989 which is a more current version of test procedure 118-1983.)
AATCC Technical Manual, Vol. 67, 1992, pgs. 70-71 (Test Method 22)
Acta Chimica Sinica No. 1: Huang, Bing-Nan, Bing-Huang Wang, Wei Wang, Wei-Yuan Huang, "Studies on Sulfinatodehalogenation IV. The Sulfinatodebromination of Primary Perfluoroalkyl Bromides and Perfluoroalkylene $\alpha$, $\omega$-Dibromides" 1986.
Acta Chimica Sinica No. 2: Wei-Yuan Huang, Wei Wang, Bing-Nan Huang "Studies on Sulfinatodehalogenation VIII. Sodium Dithionite-Initiated Perfluoroalkyl Radical Addition on Double Bond" 1986.
Liebigs Ann. Chem. "A Simple Synthesis of Tetraalkylammonium Salts with Functional Anions", Heinz Kobler, Rudolf Munz, Al Gasser, Gerhard Simchen, University Stuttgart, Chemie, Ltd., 1978, pgs. 1937-1945.
Abstract for Chinese patent 1072407

UNITED STATES PATENT AND TRADEMARK OFFICE
CERTIFICATE OF CORRECTION

PATENT NO. : 6,197,426 B1
DATED : March 6, 2001
INVENTOR(S) : Dirk M. Coppens

It is certified that error appears in the above-identified patent and that said Letters Patent is hereby corrected as shown below:

Abstract for German patent 1294949
Abstract for German patent 1294949
Abstract for French patent 2287432
Abstract for Japanese patent 63235334
Abstract for Japanese patent 03017106
Abstract for Japanese patent 1151293
Derwent abstract for Japanese patent 60152585
Carlson, D.P. and W. Schmiegel in W. Gerhartz, et al., Ed, Ullmann's Encyclopedia of Industrial Chemistry, 5$^{th}$ ed., vol. A11, 1988, pp 393-429.
Fielding, H. C., "Organofluorine Compounds and Their Applications," R. E. Banks, Ed., Society of Chemical Industry, London, 1979, pg 214.
Hu, C.M., F. L. Quing, W.Y. Huang, J. Org. Chem., 56, 1991, pp 2801-2804
Hu, Xu and Huang, J. Fluor. Chem., 42, 1989, pp 145-148.
Hu, Xu and Huang, J. Fluor. Chem., 49, 1990, pp 433-437
Huang, W.Y., J. Fluor. Chem., 58, 1992, pp 1-8
Huang, Liu and J. Li, J. Fluor. Chem., 71, 1995, pp 51-54
Huang, Huang and Hu, J. Fluor. Chem. 23, 1983, pp 229-240
H. Mark et al., Ed., Encyclopedia of Polymer Science & Engineering, 2$^{nd}$ Ed., "Acrylamide Polymers", Vol. 1, John Wiley & Sons, New York, 1985, pp 169-211.
H. Mark et al., Ed., Encyclopedia of Polymer Science & Engineering, 2$^{nd}$ Ed., "Acrylic and Methacrylic Acid Polymers", Vol. 1, John Wiley & Sons, New York, 1985, pp 211-234.
H. Mark et al., Ed., Encyclopedia of Polymer Science & Engineering, 2$^{nd}$ Ed., "Acrylic and Methacrylic Ester Polymers", Vol. 1, John Wiley & Sons, New York, 1985, pp 234-299.
H. Mark et al., Ed., Encyclopedia of Polymer Science & Engineering, 2$^{nd}$ Ed., "Maleic and Fumaric Polymers", Vol. 9, John Wiley & Sons, New York, 1985, pp 225-294.
H. Mark et al., Ed., Encyclopedia of Polymer Science & Engineering, 2$^{nd}$ Ed., "Vinyl Ester Polymers", Vol. 17, John Wiley & Sons, New York, 1985, pp393-468.
H. Mark et al., Ed., Encyclopedia of Polymer Science & Engineering, 2$^{nd}$ Ed., "Vinylidene Chloride Polymers", Vol. 17, John Wiley & Sons, New York, 1985, pp 492-531.
Sneed, M. C., R. C. Brasted, Comprehensive Organic Chemistry, vol. 6, pp 61-64
Wakselman, J. Fluor. Chem., 59, 1992, pp 367-378
Wu, F. H. and B. N. Huang, J. Fluor. Chem.,67, 1994, pp 233-234

Column 4,
Line 16, "perfluorocycloallyl" should read -- perfluorocycloalkyl --;

UNITED STATES PATENT AND TRADEMARK OFFICE
CERTIFICATE OF CORRECTION

PATENT NO. : 6,197,426 B1
DATED : March 6, 2001
INVENTOR(S) : Dirk M. Coppens

It is certified that error appears in the above-identified patent and that said Letters Patent is hereby corrected as shown below:

Column 9,
Line 59, "11 8-1983" should read -- 118-1983 --;

Column 10,
Line 36, "$AC_{812}$:" should read -- AC812: --;

Column 12,
Line 20, "$C_4$" should read -- C4 --;

Column 16,
Line 30, "hydrochlorofluoro carbons" should read -- hydrochlorofluorocarbons --;

Column 17,
Line 17, "lining" should read -- linking --; and
Line 37, "$R^1$" should read -- $R^a$ --.

Signed and Sealed this

Sixteenth Day of July, 2002

*Attest:*

JAMES E. ROGAN
*Attesting Officer*          *Director of the United States Patent and Trademark Office*